(12) United States Patent
Raghavan et al.

(10) Patent No.: US 11,425,624 B2
(45) Date of Patent: Aug. 23, 2022

(54) BEAM FAILURE RECOVERY IN MILLIMETER WAVE SYSTEMS WITH NETWORK ASSISTED USER EQUIPMENT COOPERATION

(71) Applicant: QUALCOMM Incorporated, San Diego, CA (US)

(72) Inventors: Vasanthan Raghavan, West Windsor Township, NJ (US); Tianyang Bai, Bridgewater, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 16/829,927

(22) Filed: Mar. 25, 2020

(65) Prior Publication Data

US 2020/0322865 A1    Oct. 8, 2020

Related U.S. Application Data

(60) Provisional application No. 62/831,099, filed on Apr. 8, 2019.

(51) Int. Cl.
*H04W 36/30* (2009.01)
*H04W 36/06* (2009.01)
(Continued)

(52) U.S. Cl.
CPC ......... *H04W 36/305* (2018.08); *H04W 36/06* (2013.01); *H04W 52/367* (2013.01);
(Continued)

(58) Field of Classification Search
CPC . H04W 36/305; H04W 36/06; H04W 52/367; H04W 52/383; H04W 76/14;
(Continued)

(56) References Cited

U.S. PATENT DOCUMENTS

2018/0054832 A1    2/2018  Luo et al.
2018/0166779 A1*   6/2018  Feria ................. H04B 7/18573
(Continued)

FOREIGN PATENT DOCUMENTS

EP          2871911 A1    5/2015
WO       2014117854 A1    8/2014
(Continued)

OTHER PUBLICATIONS

International Search Report and Written Opinion—PCT/US2020/024929—ISA/EPO—dated Jun. 17, 2020.

*Primary Examiner* — Peter P Chau
(74) *Attorney, Agent, or Firm* — Harrity & Harrity, LLP

(57) ABSTRACT

Various aspects of the present disclosure generally relate to wireless communication. In some aspects, a first user equipment (UE) may detect a beam failure associated with a millimeter wave link between the first UE and a base station; and transmit, to a second UE and via a millimeter wave link between the first UE and the second UE, a communication associated with performing a beam failure recovery (BFR) for the millimeter wave link between the first UE and the base station, wherein the second UE is capable of communicating with the base station via a millimeter wave link between the second UE and the base station. Numerous other aspects are provided.

30 Claims, 7 Drawing Sheets

(51) Int. Cl.
*H04W 52/36* (2009.01)
*H04W 52/38* (2009.01)
*H04W 76/14* (2018.01)
*H04W 92/18* (2009.01)

(52) U.S. Cl.
CPC ......... *H04W 52/383* (2013.01); *H04W 76/14* (2018.02); *H04W 92/18* (2013.01)

(58) Field of Classification Search
CPC ..... H04W 92/18; H04W 36/08; H04W 16/28; H04W 76/19; H04B 17/318; H04B 7/0695; H04B 7/088
See application file for complete search history.

(56) References Cited

U.S. PATENT DOCUMENTS

| | | |
|---|---|---|
| 2018/0192384 A1* | 7/2018 | Chou .................. H04W 72/044 |
| 2018/0227899 A1 | 8/2018 | Yu et al. |
| 2018/0249394 A1* | 8/2018 | Nilsson ................ H04W 40/12 |
| 2021/0211348 A1* | 7/2021 | Li ....................... H04L 41/0668 |
| 2021/0282168 A1* | 9/2021 | Matsumura ....... H04W 72/1273 |

FOREIGN PATENT DOCUMENTS

| | | | |
|---|---|---|---|
| WO | 2017024516 A1 | 2/2017 | |
| WO | WO-2018160372 A1 * | 9/2018 | ............ H04W 88/04 |
| WO | 2019036940 A1 | 2/2019 | |
| WO | WO-2020157977 A1 * | 8/2020 | ............... H04B 7/06 |

* cited by examiner

BEAM FAILURE RECOVERY IN MILLIMETER WAVE SYSTEMS WITH NETWORK ASSISTED USER EQUIPMENT COOPERATION

CROSS-REFERENCE TO RELATED APPLICATION

This patent application claims priority to Provisional Patent Application No. 62/831,099, filed on Apr. 8, 2019, entitled "BEAM FAILURE RECOVERY IN MILLIMETER WAVE SYSTEMS WITH NETWORK ASSISTED USER EQUIPMENT COOPERATION," and assigned to the assignee hereof. The disclosure of the prior Application is considered part of and is incorporated by reference in this patent application.

FIELD OF THE DISCLOSURE

Aspects of the present disclosure generally relate to wireless communication, and to techniques and apparatuses for beam failure recovery (BFR) in millimeter wave (mmW) systems with network assisted user equipment (UE) cooperation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first user equipment (UE), may include detecting a beam failure associated with a millimeter wave link between the first UE and a base station; and transmitting, to a second UE and via a millimeter wave link between the first UE and the second UE, a communication associated with performing a beam failure recovery (BFR) for the millimeter wave link between the first UE and the base station, wherein the second UE is capable of communicating with the base station via a millimeter wave link between the second UE and the base station.

In some aspects, a first UE for wireless communication may include memory and one or more processors operatively coupled to the memory. The memory and the one or more processors may be configured to detect a beam failure associated with a millimeter wave link between the first UE and a base station; and transmit, to a second UE and via a millimeter wave link between the first UE and the second UE, a communication associated with performing a BFR for the millimeter wave link between the first UE and the base station, wherein the second UE is capable of communicating with the base station via a millimeter wave link between the second UE and the base station.

In some aspects, a non-transitory computer-readable medium may store one or more instructions for wireless communication. The one or more instructions, when executed by one or more processors of a first UE, may cause the one or more processors to detect a beam failure associated with a millimeter wave link between the first UE and a base station; and transmit, to a second UE and via a millimeter wave link between the first UE and the second UE, a communication associated with performing a BFR for the millimeter wave link between the first UE and the base station, wherein the second UE is capable of communicating with the base station via a millimeter wave link between the second UE and the base station.

In some aspects, a first apparatus for wireless communication may include means for detecting a beam failure associated with a millimeter wave link between the apparatus and a base station; and means for transmitting, to a UE and via a millimeter wave link between the apparatus and the UE, a communication associated with performing a BFR for the millimeter wave link between the apparatus and the base station, wherein the UE is capable of communicating with the base station via a millimeter wave link between the UE and the base station.

In some aspects, a method of wireless communication, performed by a second UE, may include receiving, from a first UE and via a millimeter wave link between the first UE and the second UE, a communication associated with performing a BFR for a millimeter wave link between the first UE and a base station; and transmitting the communication to the base station via a millimeter wave link between the second UE and the base station.

In some aspects, a second UE for wireless communication may include memory and one or more processors operatively coupled to the memory. The memory and the one or more processors may be configured to receive, from a first UE and via a millimeter wave link between the first UE and the second UE, a communication associated with performing a BFR for a millimeter wave link between the first UE and a base station; and transmit the communication to the base station via a millimeter wave link between the second UE and the base station.

In some aspects, a non-transitory computer-readable medium may store one or more instructions for wireless communication. The one or more instructions, when executed by one or more processors of a second UE, may cause the one or more processors to receive, from a first UE and via a millimeter wave link between the first UE and the second UE, a communication associated with performing a BFR for a millimeter wave link between the first UE and a base station; and transmit the communication to the base station via a millimeter wave link between the second UE and the base station.

In some aspects, a second apparatus for wireless communication may include means for receiving, from a UE and via a millimeter wave link between the UE and the apparatus, a communication associated with performing a BFR for a millimeter wave link between the UE and a base station; and means for transmitting the communication to the base station via a millimeter wave link between the apparatus and the base station.

In some aspects, a method of wireless communication, performed by a base station, may include receiving, from a second UE, a communication associated with performing a BFR for a millimeter wave link between a first UE and the base station, wherein the communication is received via a millimeter wave link between the second UE and the base station; and transmitting, to the second UE and based at least in part on the communication, a response associated with performing the BFR for the millimeter wave link between the first UE and the base station, wherein the response is transmitted via the millimeter wave link between the second UE and the base station, and wherein the second UE is capable of communicating with the first UE via a millimeter wave link between the second UE and the first UE.

In some aspects, a base station for wireless communication may include memory and one or more processors operatively coupled to the memory. The memory and the one or more processors may be configured to receive, from a second UE, a communication associated with performing a BFR for a millimeter wave link between a first UE and the base station, wherein the communication is received via a millimeter wave link between the second UE and the base station; and transmit, to the second UE and based at least in part on the communication, a response associated with performing the BFR for the millimeter wave link between the first UE and the base station, wherein the response is transmitted via the millimeter wave link between the second UE and the base station, and wherein the second UE is capable of communicating with the first UE via a millimeter wave link between the second UE and the first UE.

In some aspects, a non-transitory computer-readable medium may store one or more instructions for wireless communication. The one or more instructions, when executed by one or more processors of a base station, may cause the one or more processors to receive, from a second UE, a communication associated with performing a BFR for a millimeter wave link between a first UE and the base station, wherein the communication is received via a millimeter wave link between the second UE and the base station; and transmit, to the second UE and based at least in part on the communication, a response associated with performing the BFR for the millimeter wave link between the first UE and the base station, wherein the response is transmitted via the millimeter wave link between the second UE and the base station, and wherein the second UE is capable of communicating with the first UE via a millimeter wave link between the second UE and the first UE.

In some aspects, an apparatus for wireless communication may include means for receiving, from a second UE, a communication associated with performing a BFR for a millimeter wave link between a first UE and the apparatus, wherein the communication is received via a millimeter wave link between the second UE and the apparatus; and means for transmitting, to the second UE and based at least in part on the communication, a response associated with performing the BFR for the millimeter wave link between the first UE and the apparatus, wherein the response is transmitted via the millimeter wave link between the second UE and the apparatus, and wherein the second UE is capable of communicating with the first UE via a millimeter wave link between the second UE and the first UE.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
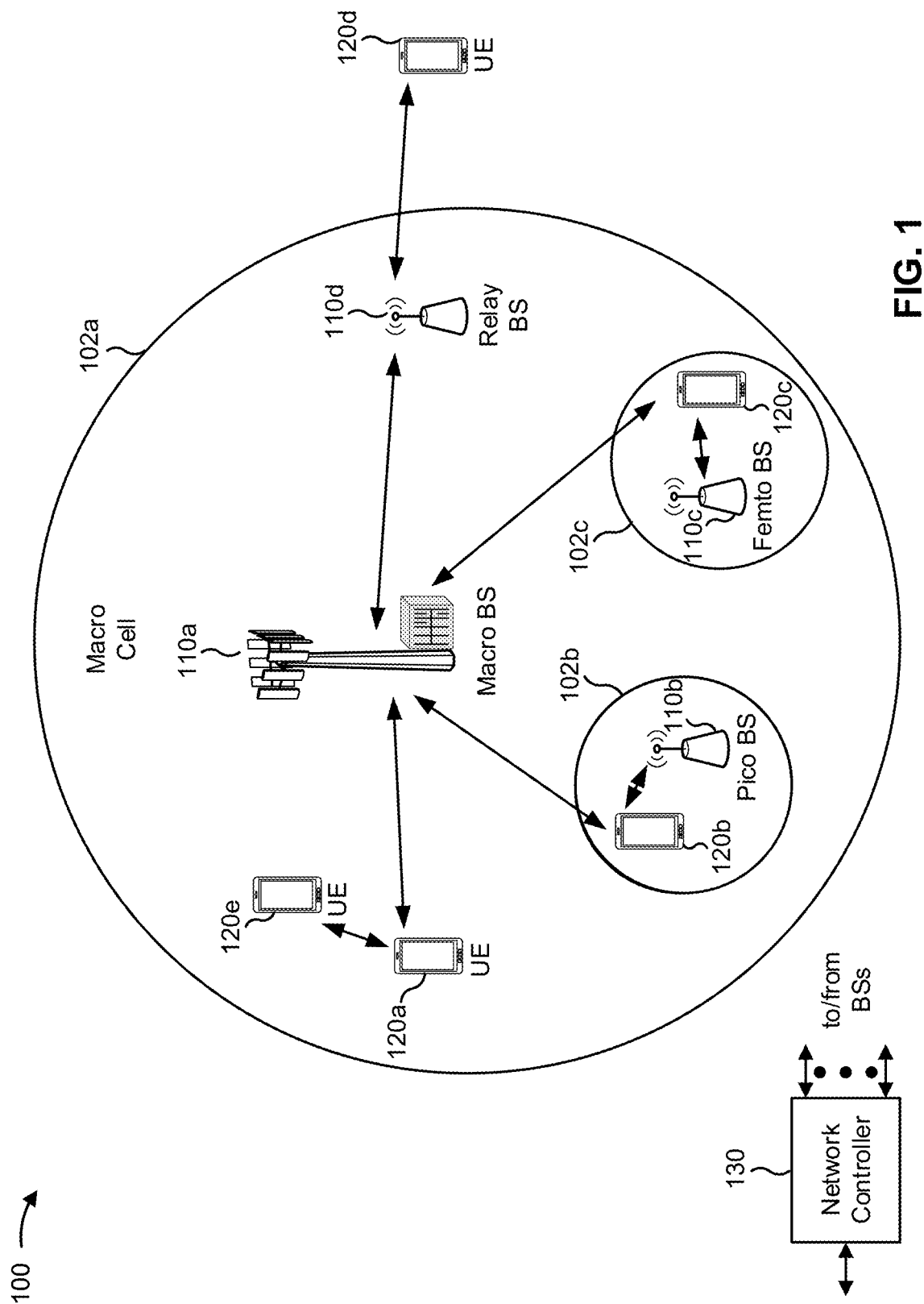
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a mobile terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
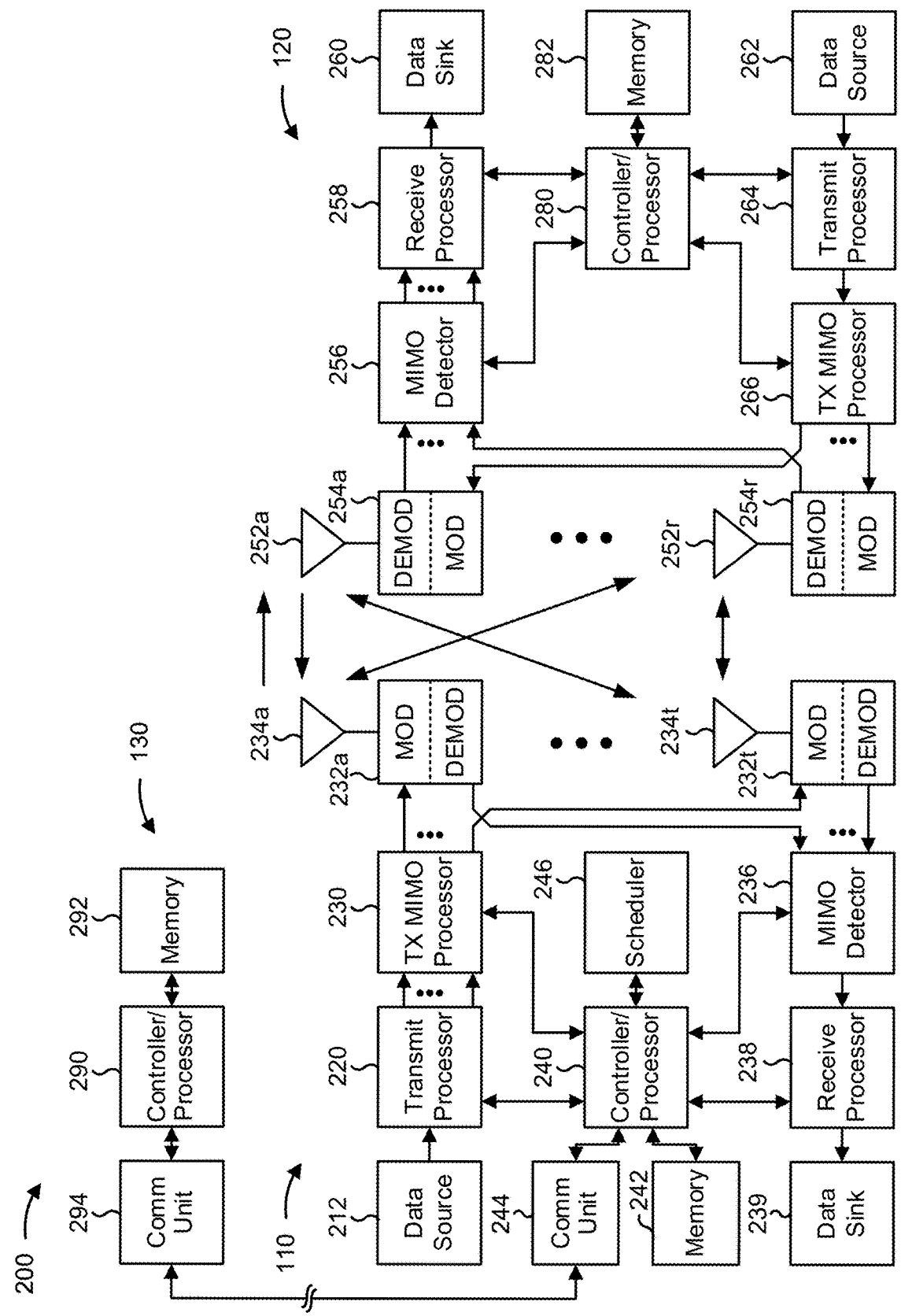
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with beam failure recovery (BFR) in a millimeter wave (mmW) system with network assisted UE cooperation, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, a first UE 120 may include means for detecting a beam failure associated with a millimeter wave link between the first UE 120 and a base station 110; means for transmitting, to a second UE 120 and via a millimeter wave link between the first UE 120 and the second UE 120, a communication associated with performing a BFR for the millimeter wave link between the first UE 120 and the base station 110, wherein the second UE 120 is capable of communicating with the base station 110 via a millimeter wave link between the second UE 120 and the base station 110; and/or the like. In some aspects, such means may include one or more components of UE 120 described in connection with FIG. 2.

In some aspects, a second UE 120 may include means for receiving, from a first UE 120 and via a millimeter wave link between the first UE 120 and the second UE 120, a communication associated with performing a BFR for a millimeter wave link between the first UE 120 and a base station 110; means for transmitting the communication to the base station 110 via a millimeter wave link between the second UE 120 and the base station 110; and/or the like. In some aspects, such means may include one or more components of UE 120 described in connection with FIG. 2.

In some aspects, base station 110 may include means for receiving, from a second UE 120, a communication associated with performing a BFR for a millimeter wave link between a first UE 120 and the base station 110, wherein the communication is received via a millimeter wave link between the second UE 120 and the base station 110; means for transmitting, to the second UE 120 and based at least in part on the communication, a response associated with performing the BFR for the millimeter wave link between the first UE 120 and the base station 110, wherein the response is transmitted via the millimeter wave link between the second UE 120 and the base station 110, and wherein the second UE 120 is capable of communicating with the first UE 120 via a millimeter wave link between the second UE 120 and the first UE 120; and/or the like. In some aspects, such means may include one or more components of base station 110 described in connection with FIG. 2.

As indicated above, FIG. 2 is provided as an example. Other examples may differ from what is described with regard to FIG. 2.

In some wireless systems, such as a millimeter wave (mmW) system, beam blockage (e.g., caused by a hand, a body, an object, and/or the like) is a significant concern. In some systems, when a beam is blocked, a beam failure recovery (BFR) procedure can be initiated, the end-goal of which is to switch to an alternate beam pair or eventually terminate the link. The BFR procedure is intended to be a comparatively faster process for link recovery than a radio link failure (RLF) procedure (e.g., as used in an LTE network). For example, the BFR procedure uses lower layer signaling that is comparatively faster than upper layer signaling used by the RLF procedure. Further, using the RLF procedure in association with relatively narrow beams that can be easily or frequently blocked (e.g., as in the case of a mmW system) may result in undesirable latency, making the BFR procedure a more desirable option.

A first step of a BFR procedure is a detection of a beam failure. For example, a UE may observe a drop in signal quality (e.g., measured as a hypothetical block error rate (BLER), as a layer 1 reference signal received power (RSRP) from a reference signal (RS) measurement, and/or the like). In some cases, a periodic channel state information RS (CSI-RS) or synchronization signal block (SSB) that is spatially quasi co-located (QCL) with a physical downlink control channel (PDCCH) is used as a reference signal for beam failure detection. Each observation of a beam failure is referred to as a beam failure instance. The UE may continue monitoring for beam failure instances, and if a number of beam failure instances satisfies a threshold configured on the UE (e.g., a threshold number of beam failure instances within a particular duration of time), then the UE may detect a beam failure and initiate a BFR.

A second step of the BFR procedure includes identifying an alternate beam pair. Here, the UE measures a layer 1 RSRP for a reference signal transmitted by a base station in association with identifying an alternate beam pair. In some cases, the base station identifies an appropriate RS (e.g., CSI-RS, SSB, and/or the like) and transmits the RS to allow the UE to measure the layer 1 RSRP for alternate beam pair candidates. In some configurations, the UE indicates to the base station that the UE has detected a beam failure, and the base station identifies and transmits the RS based on the indication from the UE. Alternatively, the base station can be configured to automatically transmit the RS (e.g., on a periodic basis) and the UE can measure the layer 1 RSRP for the RS accordingly (e.g., without providing an indication of the beam failure to the base station). In any case, if the UE identifies a suitable alternate beam pair (e.g., an alternate beam pair candidate with an RSRP that satisfies a threshold for link recovery) based on measuring the layer 1 RSRP of the RS, then the UE proceeds with a third step of the BFR.

The third step of the BFR procedure includes transmission of a recovery request by the UE. For example, the UE can transmit a recovery request using a particular set of random access channel (RACH) resources that corresponds to the identified alternate beam pair. Here, the base station identifies the alternate beam pair, identified by the UE, based on the recovery request being received in the particular set of RACH resources.

A fourth step of the BFR procedure is transmission and reception of a response (e.g., a random access response (RAR)) to the recovery request. For example, the base station may transmit a downlink assignment or an uplink grant via PDCCH. Here, if the UE receives the response, then the BFR is complete and the UE switches to the alternate beam pair. If the UE does not receive the response, a configured maximum (threshold) number of retransmissions are performed. Here, if the response is not received by the UE within the threshold number of retransmissions, the RLF procedure is invoked (e.g., to allow cell re-selection to begin).

Notably, the BFR procedure may accrue some latency in association with transmitting the recovery request via the set of RACH resources and receiving the response from the base station. Further, there may be some scenarios in which the UE may not be able to convey a beam switch request properly, such as when the UE identifies a maximum permissible exposure (MPE) constraint associated with the alternate beam pair.

In some systems, UEs may be configured to allow communication using links between UEs (e.g., rather than communicating through links with a base station). For example, a first UE and a second UE may be configured to allow a link between the first UE and the second UE to be established (e.g., to allow the first and second UEs to communicate via the link). Such a link can be established according to, for example, a protocol associated with network assisted UE cooperation (NAUC), network controlled interactive services (NCIS), a protocol associated with mmW relaying, and/or the like. As described below, deficiencies in the BFR process (e.g., those present when a BFR is performed in a mmW system) can be mitigated through utilization of such UE-UE links.

Some aspects described herein provide techniques and apparatuses for improved beam failure recovery in a millimeter wave system. In some aspects, the BFR is improved by utilizing a link between a UE that is to perform a BFR associated with a base station, and a UE that is connected to the base station, in association with performing the BFR. In some aspects, using this UE-UE link reduces latency and improves reliability of the BFR procedure, as described below.

Figure 3A:
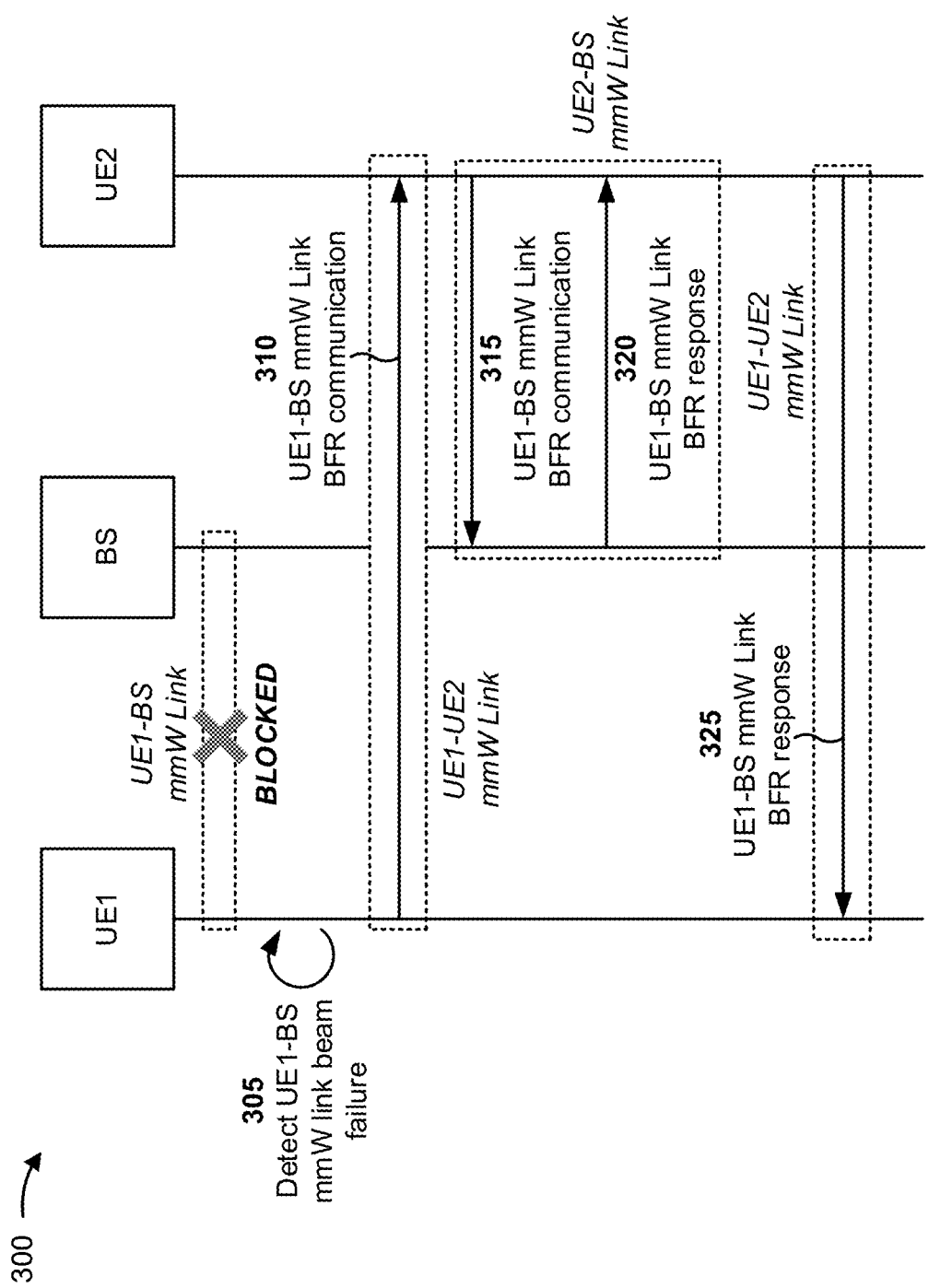
FIGS. 3A and 3B are diagrams illustrating an example of a BFR in a mmW system with network assisted UE cooperation, in accordance with various aspects of the present disclosure.
Figure 3B:
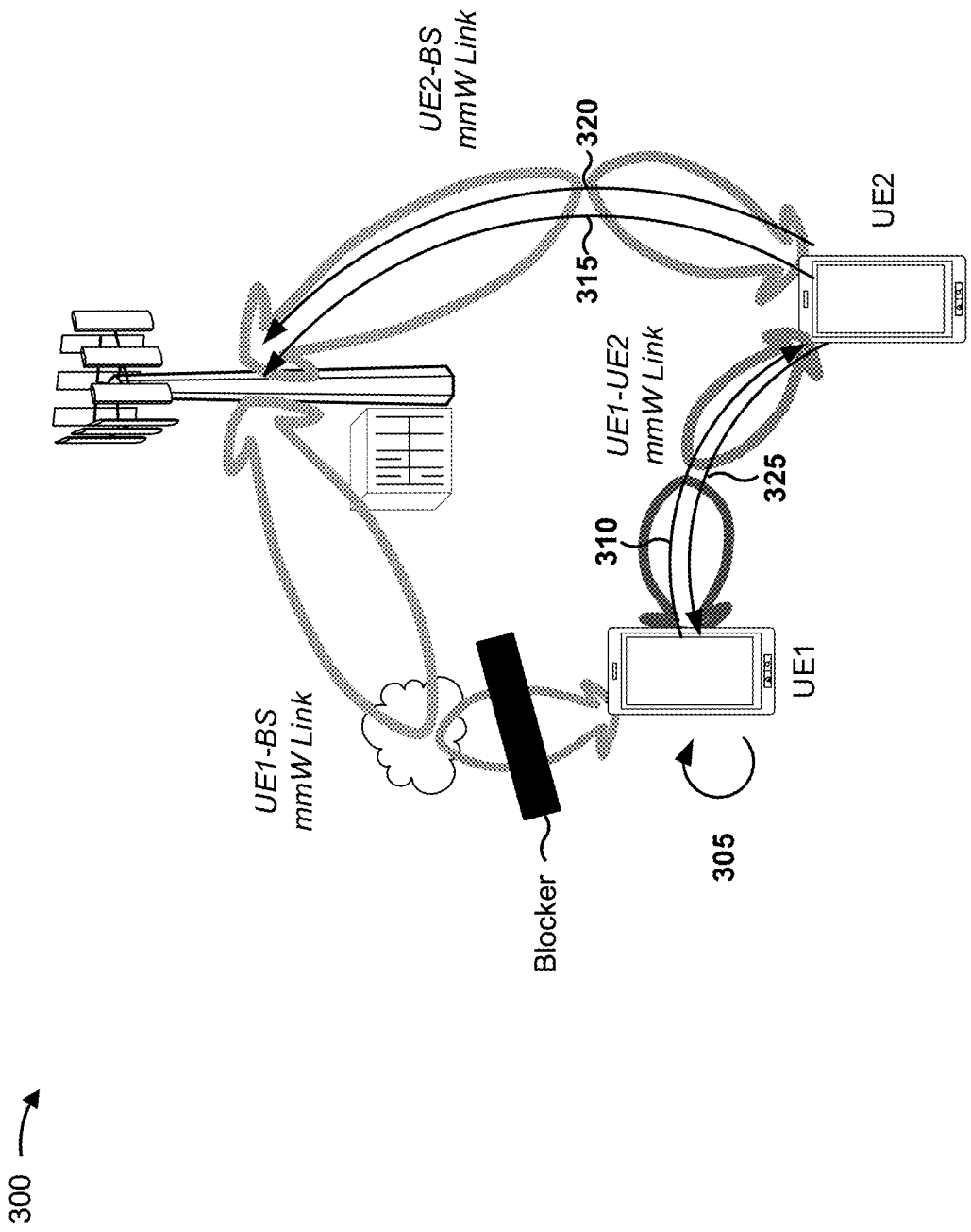

FIGS. 3A and 3B are diagrams illustrating an example 300 of BFR in a mmW system with network assisted UE cooperation, in accordance with various aspects of the present disclosure. In example 300, a first mmW link has been established between a first UE (e.g., a first UE 120, identified as UE1 in FIGS. 3A and 3B) and a base station (e.g., a base station 110, identified as BS in FIGS. 3A and 3B), and a second mmW link has been established between a second UE (e.g., a second UE 120, identified as UE2 in FIGS. 3A and 3B). and the base station.

As indicated in FIGS. 3A and 3B, the first mmW link may become blocked (e.g., by a blocker, such as a hand, a body, another human, a vehicle, a building, foliage, and/or the like) and/or may fade. As shown by reference number 305, and in a manner similar to that described above, the first UE may detect a beam failure associated with the first mmW link (i.e., the mmW link between the first UE and the base station).

As shown by reference number 310, the UE may transmit, to the second UE, a communication associated with performing the BFR for the first mmW link. In some aspects, as indicated in FIGS. 3A and 3B, the first UE may transmit the communication via a third mmW link, which is a mmW link between the first UE and the second UE.

In some aspects, the third mmW link may be established prior to the detection of the beam failure by the first UE. Alternatively, the third mmW link may be established based at least in part on the detection of the beam failure (e.g., the first UE may initiate the establishment of the third mmW link based at least in part on detecting the beam failure).

In some aspects, the first UE and the second UE may be configured to communicate according to a protocol associated with network assisted UE cooperation, a protocol associated with network controlled interactive services (NCIS), a protocol associated with mmW relaying, and/or the like. Here, establishment of the third mmW link between the first UE and the second UE and/or communications between the first UE and the second UE may be performed in accordance with the applicable protocol.

In some aspects, the second UE may be one of a set of UEs with which the first UE has established mmW links. In other words, the first UE may be connected to a set of UEs via a set of corresponding respective mmW links. Here, the first UE may select the second UE/second mmW link from the set of UEs/set of mmW links in association with transmitting the communication. The selection can be based at least in part on, for example, determining that the second UE is connected to the base station via the second mmW link, based at least in part on priority indicators associated with the set of UEs/set of mmW links, based at least in part on observed signal strengths associated with the set of mmW links, and/or one or more other criteria.

In some aspects, the communication may include information indicating the beam failure associated with the first mmW link. For example, the communication may include an indication that the first UE has detected a beam failure associated with the first mmW link.

In some aspects, the communication may include information indicating a switch to an alternate beam pair. For example, the first UE may identify (e.g., based at least in part on measuring a layer 1 RSRP for a reference signal associated with the alternate beam pair) the alternate beam pair for the switch associated with performing the BFR. Here, the first UE needs to inform the base station regarding the switch to the alternate beam pair and, therefore, can include information indicating the switch to the alternate beam pair (e.g., information that identifies the alternate beam pair) in the communication to the second UE.

In some aspects, the first UE may transmit the communication to the second UE (via the third mmW link) based at least in part on identifying a maximum permissible exposure (MPE) constraint associated with the alternate beam pair. For example, the first UE may identify an MPE constraint associated with the alternate beam pair (e.g., when a hand or body of a user is along a direction of the alternate beam pair at the UE side). In such a case, the UE would typically be required to transmit a communication (e.g., a recovery request) to the base station with a reduced transmit power. However, a transmission of the recovery request with the reduced transmit power can lead to packet drops, which may cause the BFR to fail (after which the RLF procedure may be initiated). Thus, in some aspects, the first UE may transmit the communication to the second UE with the reduced uplink transmit power to address this issue. For example, the first UE may use the reduced transmit power to send the communication (e.g., the recovery request) to the second UE, with which the first UE may have a better link than the link to the base station. In some aspects, the communication may include information that identifies a set of candidate beam pairs, associated with performing the BFR, identified by the first UE (e.g., when the multiple suitable alternate beam pairs are identified).

In some aspects, the first UE may transmit the communication to the second UE (via the third mmW link) based at least in part on unsuitability of alternate beam pairs, associated with performing the BFR, being identified by the first UE. For example, after initiating the BFR, the first UE may fail to identify any suitable alternate beam pairs to switch to in association with the BFR of the first mmW link. Typically, the first UE would be forced to use a contention-based RACH (CBRA) process, which would eventually fail, after which the RLF procedure would be initiated, thereby introducing latency and wasting power or other resources at the UE. Thus, in some aspects, the first UE can be configured to transmit the communication to the base station via the second UE. In this example, the communication may include a message indicating that no suitable alternate beam pair was identified by the first UE, a request to terminate the first mmW link, and/or the like. In such a case, the base station may receive the communication, and may act accordingly. For example, the base station may perform an early termination of the first mmW link, may allocate additional RS resources for better beam pair identification, may convey a response to the first UE via the second UE, and/or the like.

As further shown in FIGS. 3A and 3B, the second UE may receive, from the first UE and via the third mmW link, the communication transmitted by the first UE in association with performing the BFR for the first mmW link. As shown by reference number 315, the second UE may then transmit the communication to the base station via the second mmW link.

As further shown in FIGS. 3A and 3B, the base station may receive, from the second UE and via the second mmW link, the communication associated with performing the BFR for the first mmW link. As shown by reference number 320, the base station may transmit, to the second UE via the second mmW link, a response associated with performing the BFR for the first mmW link.

In some aspects, the response may include a beam pair switching message. For example, as described above, the first UE may identify an alternate beam pair associated with performing the BFR for the first mmW link. In this example, the response may include information associated with switching to the alternate beam pair (e.g., an indication that the switch to the alternate beam pair has been approved such that the first UE should switch to the alternate beam pair).

In some aspects, the response may include information associated with terminating the first mmW link. For example, as described above, when the first UE fails to identify any suitable alternate beam pairs, the communication may include a request to terminate the first mmW link. In this example, the response may include information associated with terminating the first mmW link.

In some aspects, the response may include information associated with an allocation of reference signal resources to the first UE in association with performing alternate beam pair identification. For example, as described above, when the first UE fails to identify any suitable alternate beam pairs, the communication may include an indication that no suitable beam pairs were identified by the first UE. In this example, the response may include information associated with an allocation of reference signal resources to the first UE in association with performing alternate beam pair identification (e.g., such that the first UE may retry identifying suitable alternate beam pairs).

As further shown in FIGS. 3A and 3B, the second UE may receive the response transmitted by the base station via the second mmW link. As shown by reference number 325, the second UE may transmit the response to the first UE via the third mmW link.

As indicated above, FIGS. 3A and 3B are provided as an example. Other examples may differ from what is described with respect to FIGS. 3A and 3B.

Figure 4:
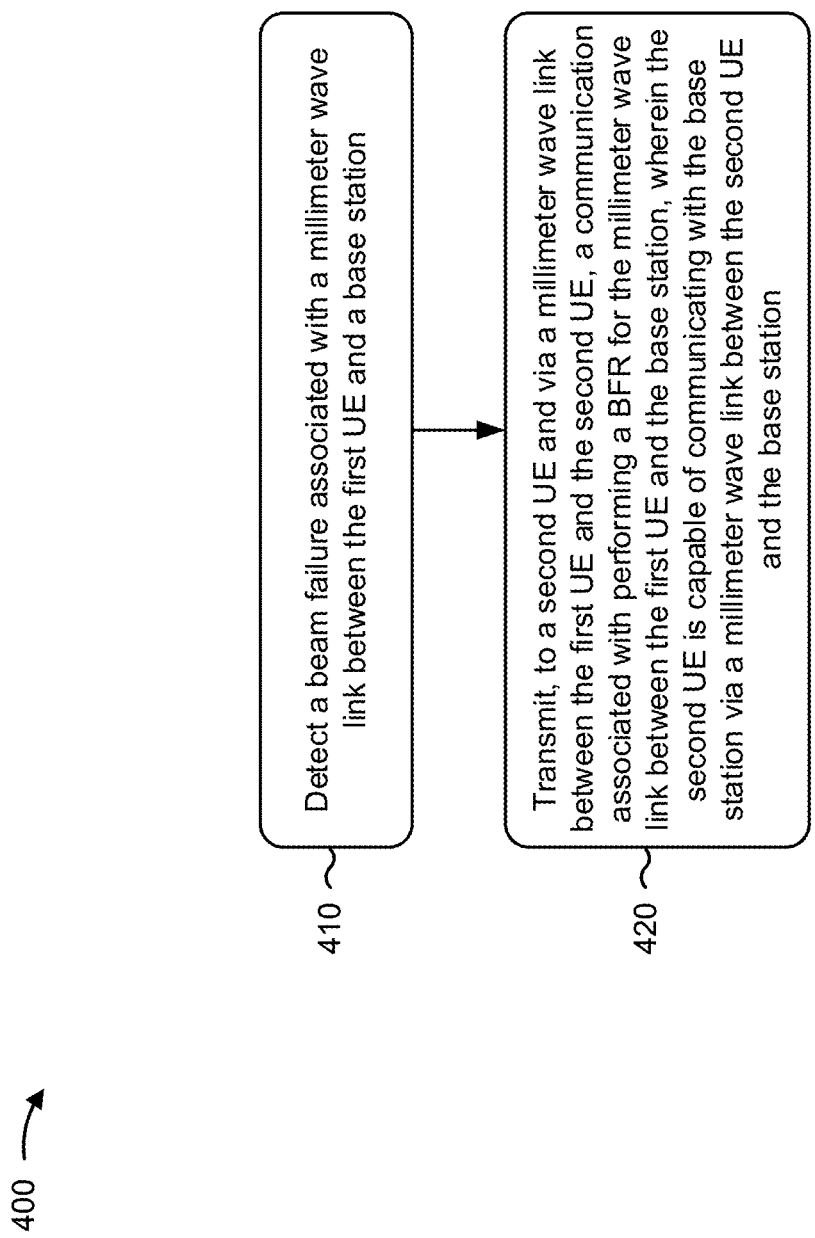
FIG. 4 is a diagram illustrating an example process performed, for example, by a UE, in accordance with various aspects of the present disclosure.

FIG. 4 is a diagram illustrating an example process 400 performed, for example, by a first UE, in accordance with various aspects of the present disclosure. Example process 400 is an example where a first UE (e.g., a first UE 120) performs operations associated with BFR in a mmW system with network assisted UE cooperation.

As shown in FIG. 4, in some aspects, process 400 may include detecting a beam failure associated with a millimeter wave link between the first UE and a base station (block 410). For example, the first UE (e.g., using antenna 252, receive processor 258, transmit processor 264, controller/processor 280, memory 282, and/or the like) may detect a beam failure associated with a millimeter wave link between the first UE and a base station (e.g., base station 110), as described above.

As further shown in FIG. 4, in some aspects, process 400 may include transmitting, to a second UE and via a millimeter wave link between the first UE and the second UE, a communication associated with performing a BFR for the millimeter wave link between the first UE and the base station (block 420). For example, the first UE (e.g., using antenna 252, transmit processor 264, controller/processor 280, and/or the like) may transmit, to a second UE and via a millimeter wave link between the first UE and the second UE, a communication associated with performing a BFR for the millimeter wave link between the first UE and the base station, as described above. In some aspects, the second UE is capable of communicating with the base station via a millimeter wave link between the second UE and the base station.

Process 400 may include additional aspects, such as any single aspect and/or any combination of aspects described below and/or in connection with one or more other processes described elsewhere herein.

In a first aspect, the first UE and/or the second UE may establish the millimeter wave link between the first UE and the second UE.

In a second aspect, alone or in combination with the first aspect, the communication includes information indicating the beam failure associated with the millimeter wave link between the first UE and the base station.

In a third aspect, alone or in combination with any one or more of the first and second aspects, the communication includes information indicating a switch to an alternate beam pair to be used in association with performing the BFR for the millimeter wave link between the first UE and the base station.

In a fourth aspect, alone or in combination with any one or more of the first through third aspects, the communication is transmitted to the second UE based at least in part on identifying a maximum permissible exposure (MPE) constraint associated with an alternate beam pair identified by the first UE in association with performing the BFR. In a fifth aspect, in combination with the fourth aspect, the communication is transmitted with a reduced transmit power based at least in part on identifying the MPE constraint.

In a sixth aspect, alone or in combination with any one or more of the first through fifth aspects, the communication includes information that identifies a set of candidate beam pairs, associated with performing the BFR, identified by the first UE.

In a seventh aspect, alone or in combination with any one or more of the first through sixth aspects, the communication is transmitted to the second UE based at least in part on unsuitability of alternate beam pairs, associated with performing the BFR, being identified by the first UE.

In an eighth aspect, alone or in combination with any one or more of the first through seventh aspects, the communication includes an indication that no alternate beam pairs, associated with performing the BFR, were identified by the first UE.

In a ninth aspect, alone or in combination with any one or more of the first through eighth aspects, the communication includes a request to terminate the millimeter wave link between the first UE and the base station.

In a tenth aspect, alone or in combination with any one or more of the first through ninth aspects, the second UE is one of a set of UEs with which the first UE has established a millimeter wave link.

In an eleventh aspect, alone or in combination with any one or more of the first through tenth aspects, the first UE and the second UE are configured to communicate according to a protocol associated with network assisted UE cooperation, a protocol associated with network controlled interactive services (NCIS), or a protocol associated with millimeter wave relaying.

In a twelfth aspect, alone or in combination with any one or more of the first through eleventh aspects, a response is received from the second UE via the millimeter wave link between the first UE and the second UE. In a thirteenth aspect, in combination with the twelfth aspect, the response includes information associated with terminating the millimeter wave link between the first UE and the base station. In a fourteenth aspect, in combination with any one or more of the twelfth and thirteenth aspects, the response includes information associated with an allocation of reference signal resources to the first UE in association with performing alternate beam pair identification. In a fifteenth aspect, in combination with any one or more of the twelfth through fourteenth aspects, the response includes a beam pair switching message.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
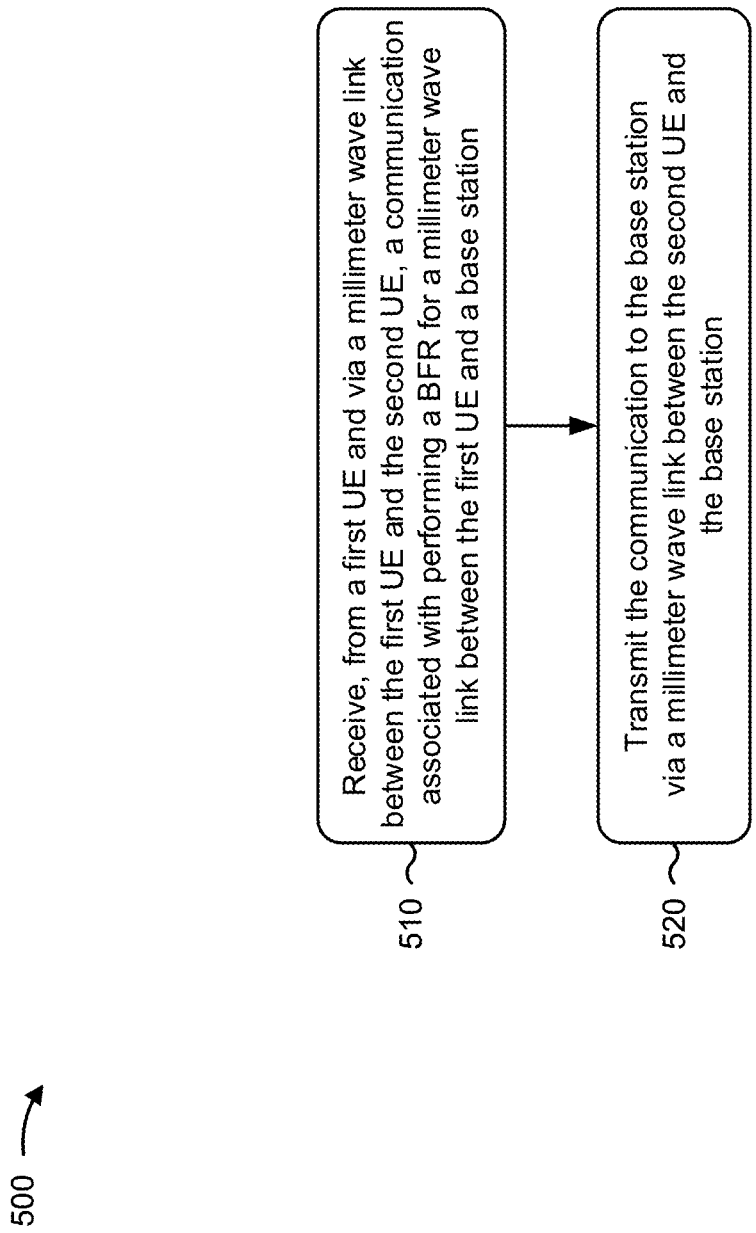
FIG. 5 is a diagram illustrating an example process performed, for example, by a UE, in accordance with various aspects of the present disclosure.

FIG. 5 is a diagram illustrating an example process 500 performed, for example, by a second UE, in accordance with various aspects of the present disclosure. Example process 500 is an example where a second UE (e.g., a second UE 120) performs operations associated with BFR in a mmW system with network assisted UE cooperation.

As shown in FIG. 5, in some aspects, process 500 may include receiving, from a first UE and via a millimeter wave link between the first UE and the second UE, a communication associated with performing a BFR for a millimeter wave link between the first UE and a base station (block 510). For example, the second UE (e.g., using antenna 252, receive processor 258, controller/processor 280, and/or the like) may receive, from a first UE (e.g., a first UE 120) and via a millimeter wave link between the first UE and the second UE, a communication associated with performing a BFR for a millimeter wave link between the first UE and a base station (e.g., base station 110), as described above.

As further shown in FIG. 5, in some aspects, process 500 may include transmitting the communication to the base station via a millimeter wave link between the second UE and the base station (block 520). For example, the second UE (e.g., using antenna 252, transmit processor 264, controller/processor 280, and/or the like) may transmit the communication to the base station via a millimeter wave link between the second UE and the base station, as described above.

Process 500 may include additional aspects, such as any single implementation or any combination of aspects described below and/or in connection with one or more other processes described elsewhere herein.

In a first aspect, the second UE and/or the first UE may establish the millimeter wave link between the first UE and the second UE.

In a second aspect, alone or in combination with the first aspect, the communication includes information indicating the beam failure associated with the millimeter wave link between the first UE and the base station.

In a third aspect, alone or in combination with any one or more of the first and second aspects, the communication includes a message that identifies an alternate beam pair to be used in association with performing the BFR for the millimeter wave link between the first UE and the base station.

In a fourth aspect, alone or in combination with any one or more of the first through third aspects, the communication includes information that identifies a set of candidate beam pairs, associated with performing the BFR, identified by the first UE.

In a fifth aspect, alone or in combination with any one or more of the first through fourth aspects, the communication includes an indication that no alternate beam pairs, associated with performing the BFR, were identified by the first UE.

In a sixth aspect, alone or in combination with any one or more of the first through fifth aspects, the communication includes a request to terminate the millimeter wave link between the first UE and the base station.

In a seventh aspect, alone or in combination with any one or more of the first through sixth aspects, the second UE is one of a set of UEs with which the first UE has established a millimeter wave link.

In an eighth aspect, alone or in combination with any one or more of the first through seventh aspects, the first UE and the second UE are configured to communicate according to a protocol associated with network assisted UE cooperation, a protocol associated with network controlled interactive services (NCIS), or a protocol associated with millimeter wave relaying.

In a ninth aspect, alone or in combination with any one or more of the first through eighth aspects, a response is received from the base station via the millimeter wave link between the second UE and the base station. In a tenth aspect, in combination with the ninth aspect, the response is transmitted to the first UE via the millimeter wave link between the first UE and the second UE. In an eleventh aspect, in combination with the any one or more of the ninth and tenth aspects, the response includes information associated with terminating the millimeter wave link between the first UE and the base station. In a twelfth aspect, in combination with any one or more of the ninth through eleventh aspects, the response includes information associated with an allocation of reference signal resources to the first UE in association with performing alternate beam pair identification.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
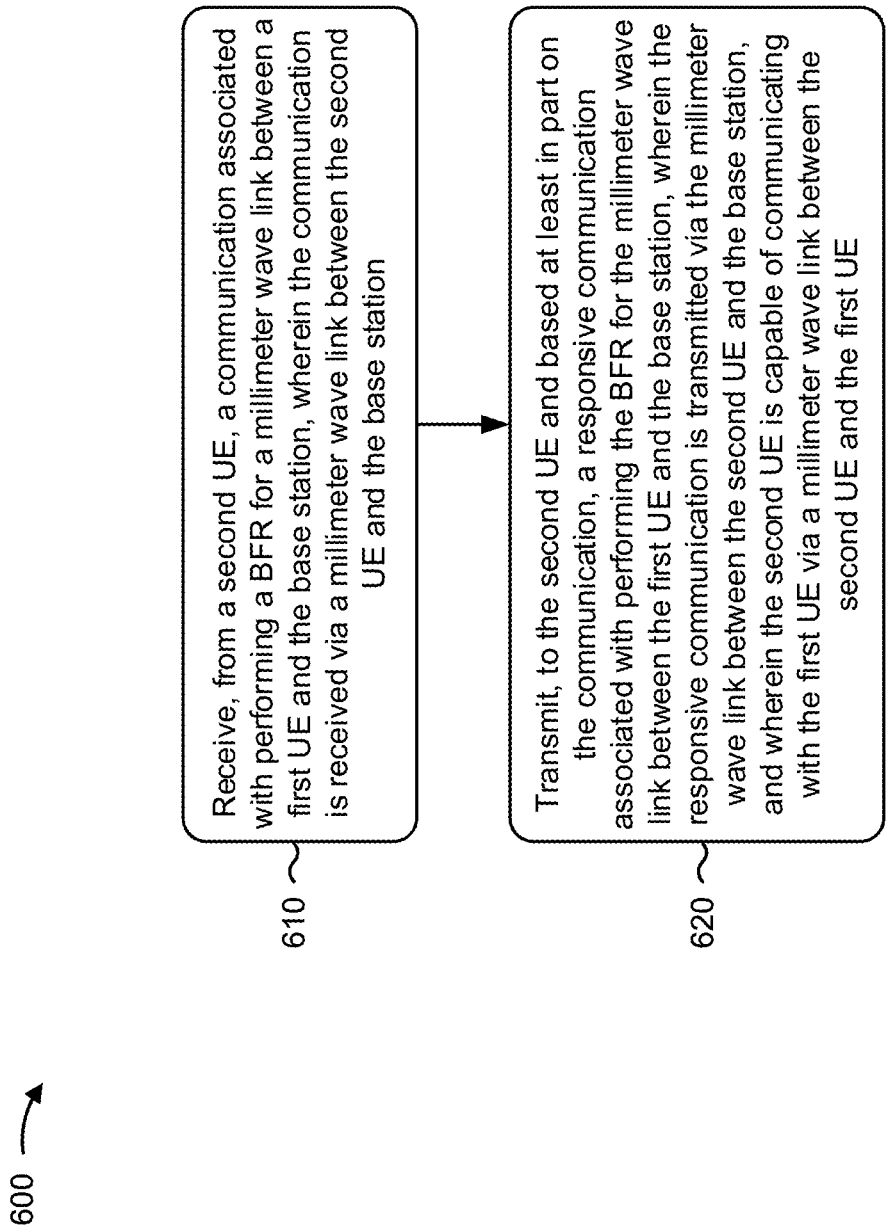
FIG. 6 is a diagram illustrating an example process performed, for example, by a UE, in accordance with various aspects of the present disclosure.

FIG. 6 is a diagram illustrating an example process 600 performed, for example, by a base station, in accordance with various aspects of the present disclosure. Example process 600 is an example where a base station (e.g., base station 110) performs operations associated with BFR in a mmW system with network assisted UE cooperation.

As shown in FIG. 6, in some aspects, process 600 may include receiving, from a UE, a communication associated with performing a BFR for a millimeter wave link between a first UE and the base station (block 610). For example, the base station (e.g., using antenna 234, receive processor 238, controller/processor 240, and/or the like) may receive, from a second UE (e.g., a second UE 120), a communication associated with performing a BFR for a millimeter wave link between a first UE (e.g., a first UE 120) and the base station, as described above. In some aspects, the communication is received via a millimeter wave link between the second UE and the base station.

As further shown in FIG. 6, in some aspects, process 600 may include transmitting, to the second UE and based at least in part on the communication, a response associated with performing the BFR for the millimeter wave link between the first UE and the base station (block 620). For example, the base station (e.g., using antenna 234, transmit processor 220, controller/processor 240, and/or the like) may transmit, to the second UE and based at least in part on the communication, a response associated with performing the BFR for the millimeter wave link between the first UE and the base station, as described above. In some aspects, the response is transmitted via the millimeter wave link between the second UE and the base station. In some aspects, the second UE is capable of communicating with the first UE via a millimeter wave link between the second UE and the first UE.

Process 600 may include additional aspects, such as any single implementation or any combination of aspects described below and/or in connection with one or more other processes described elsewhere herein.

In a first aspect, the communication includes information indicating the beam failure associated with the millimeter wave link between the first UE and the base station.

In a second aspect, alone or in combination with the first aspect, the communication includes information associated with a switch to an alternate beam pair to be used in association with performing the BFR for the millimeter wave link between the first UE and the base station.

In a third aspect, alone or in combination with any one or more of the first through second aspects, the communication includes information that identifies a set of candidate beam pairs, associated with performing the BFR, identified by the first UE.

In a fourth aspect, alone or in combination with any one or more of the first through third aspects, the communication includes an indication that no alternate beam pairs, associated with performing the BFR, were identified by the first UE.

In a fifth aspect, alone or in combination with any one or more of the first through fourth aspects, the communication includes a request to terminate the millimeter wave link between the first UE and the base station.

In a sixth aspect, alone or in combination with any one or more of the first through fifth aspects, the second UE is one of a set of UEs with which the first UE has established a millimeter wave link.

In a seventh aspect, alone or in combination with any one or more of the first through sixth aspects, the first UE and the second UE are configured to communicate according to a protocol associated with network assisted UE cooperation, a protocol associated with network controlled interactive services (NCIS), or a protocol associated with millimeter wave relaying.

In an eighth aspect, alone or in combination with any one or more of the first through seventh aspects, the response includes information associated with terminating the millimeter wave link between the first UE and the base station.

In a ninth aspect, alone or in combination with any one or more of the first through eighth aspects, the response includes information associated with an allocation of reference signal resources to the first UE in association with performing alternate beam pair identification.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:
   detecting a beam failure associated with a millimeter wave link between the first UE and a base station (BS); and
   transmitting, to a second UE and via a millimeter wave link between the first UE and the second UE, a communication associated with performing a beam failure recovery (BFR) for the millimeter wave link between the first UE and the BS,
      wherein the second UE is capable of communicating with the BS via a millimeter wave link between the second UE and the BS, and
      wherein the communication includes information regarding a switch to an alternate beam pair to be used in association with performing the BFR for the millimeter wave link between the first UE and the BS.

2. The method of claim 1, further comprising establishing the millimeter wave link between the first UE and the second UE.

3. The method of claim 1, wherein the communication includes information indicating the beam failure associated with the millimeter wave link between the first UE and the BS.

4. The method of claim 1, wherein the communication is transmitted to the second UE based at least in part on identifying a maximum permissible exposure (MPE) constraint associated with the alternate beam pair.

5. The method of claim 4, wherein the communication is transmitted with a reduced transmit power based at least in part on identifying the MPE constraint.

6. The method of claim 1, wherein the communication includes information that identifies a set of candidate beam pairs, associated with performing the BFR, identified by the first UE.

7. The method of claim 1, wherein the communication is transmitted to the second UE based at least in part on unsuitability of alternate beam pairs, associated with performing the BFR, being identified by the first UE.

8. The method of claim 1, wherein the communication includes a request to terminate the millimeter wave link between the first UE and the BS.

9. The method of claim 1, wherein the second UE is one of a set of UEs with which the first UE has established a millimeter wave link.

10. The method of claim 1, wherein the first UE and the second UE are configured to communicate according to a protocol associated with network assisted UE cooperation, a protocol associated with network controlled interactive services, or a protocol associated with millimeter wave relaying.

11. The method of claim 1, wherein a response is received from the second UE via the millimeter wave link between the first UE and the second UE,
   wherein the response is provided by the BS.

12. The method of claim 11, wherein the response includes information associated with terminating the millimeter wave link between the first UE and the BS.

13. The method of claim 11, wherein the response includes information associated with an allocation of reference signal resources to the first UE in association with performing alternate beam pair identification.

14. The method of claim 11, wherein the response includes a beam pair switching message.

15. A method of wireless communication performed by a second user equipment (UE), comprising:
   receiving, from a first UE and via a millimeter wave link between the first UE and the second UE, a communication associated with performing a beam failure recovery (BFR) for a millimeter wave link between the first UE and a base station (BS); and
   transmitting the communication via a millimeter wave link between the second UE and the BS,
      wherein the communication includes information regarding a switch to an alternate beam pair to be used in association with performing the BFR for the millimeter wave link between the first UE and the BS.

16. The method of claim 15, further comprising establishing the millimeter wave link between the first UE and the second UE.

17. The method of claim 15, wherein the communication includes at least one of:
   information indicating a beam failure associated with the millimeter wave link between the first UE and the BS,
   information that identifies a set of candidate beam pairs, associated with performing the BFR, identified by the first UE, or
   a request to terminate the millimeter wave link between the first UE and the BS.

18. The method of claim 15, wherein the second UE is one of a set of UEs with which the first UE has established a millimeter wave link.

19. The method of claim 15, wherein the first UE and the second UE are configured to communicate according to a protocol associated with network assisted UE cooperation, a protocol associated with network controlled interactive services (NCIS), or a protocol associated with millimeter wave relaying.

20. The method of claim 15, wherein a response is received from the BS via the millimeter wave link between the second UE and the BS.

21. The method of claim 20, wherein the response is transmitted to the first UE via the millimeter wave link between the first UE and the second UE.

22. The method of claim 20, wherein the response includes at least one of:
   information associated with terminating the millimeter wave link between the first UE and the BS, or
   information associated with an allocation of reference signal resources to the first UE in association with performing alternate beam pair identification.

23. A method of wireless communication performed by a base station (BS), comprising:
   receiving, a communication associated with performing a beam failure recovery (BFR) for a millimeter wave link between a first user equipment (UE) and the BS,
      wherein the communication is received via a millimeter wave link between a second UE and the BS; and
   transmitting, based at least in part on the communication, a response associated with performing the BFR for the millimeter wave link between the first UE and the BS,
      wherein the response is transmitted via the millimeter wave link between the second UE and the BS, and
      wherein the second UE is capable of communicating with the first UE via a millimeter wave link between the second UE and the first UE, and
      wherein the communication includes information regarding a switch to an alternate beam pair to be used in association with performing the BFR for the millimeter wave link between the first UE and the BS.

24. The method of claim 23, wherein the communication includes at least one of:
   information indicating a beam failure associated with the millimeter wave link between the first UE and the BS,
   information that identifies a set of candidate beam pairs, associated with performing the BFR, identified by the first UE, or
   a request to terminate the millimeter wave link between the first UE and the BS.

25. The method of claim 23, wherein the second UE is one of a set of UEs with which the first UE has established a millimeter wave link.

26. The method of claim 23, wherein the first UE and the second UE are configured to communicate according to a protocol associated with network assisted UE cooperation, a protocol associated with network controlled interactive services (NCIS), or a protocol associated with millimeter wave relaying.

27. The method of claim 23, wherein the response includes at least one of:
   information associated with terminating the millimeter wave link between the first UE and the BS, or
   information associated with an allocation of reference signal resources to the first UE in association with performing alternate beam pair identification.

28. A first user equipment (UE) for wireless communication, comprising:
   a memory; and
   one or more processors coupled to the memory, the one or more processors configured to:
      detect a beam failure associated with a millimeter wave link between the first UE and a base station (BS); and
      transmit, to a second UE and via a millimeter wave link between the first UE and the second UE, a communication associated with performing a beam failure recovery (BFR) for the millimeter wave link between the first UE and the BS,
         wherein the second UE is capable of communicating with the BS via a millimeter wave link between the second UE and the BS, and
         wherein the communication includes information regarding a switch to an alternate beam pair to be used in association with performing the BFR for the millimeter wave link between the first UE and the BS.

29. The first UE of claim 28, wherein the first UE and the second UE are configured to communicate according to a protocol associated with network assisted UE cooperation, a protocol associated with network controlled interactive services, or a protocol associated with millimeter wave relaying.

30. The first UE of claim 28, wherein the communication includes information indicating the beam failure associated with the millimeter wave link between the first UE and the BS.

* * * * *